Sept. 3, 1940.  F. D. BRADDON  2,213,832
ANTIVIBRATION MOUNT FOR DIRECTION INDICATING INSTRUMENTS
Filed April 7, 1937  2 Sheets-Sheet 1

INVENTOR
FREDERICK D. BRADDON
BY
Herbert H. Thompson
HIS ATTORNEY.

Sept. 3, 1940.    F. D. BRADDON    2,213,832
ANTIVIBRATION MOUNT FOR DIRECTION INDICATING INSTRUMENTS
Filed April 7, 1937    2 Sheets-Sheet 2
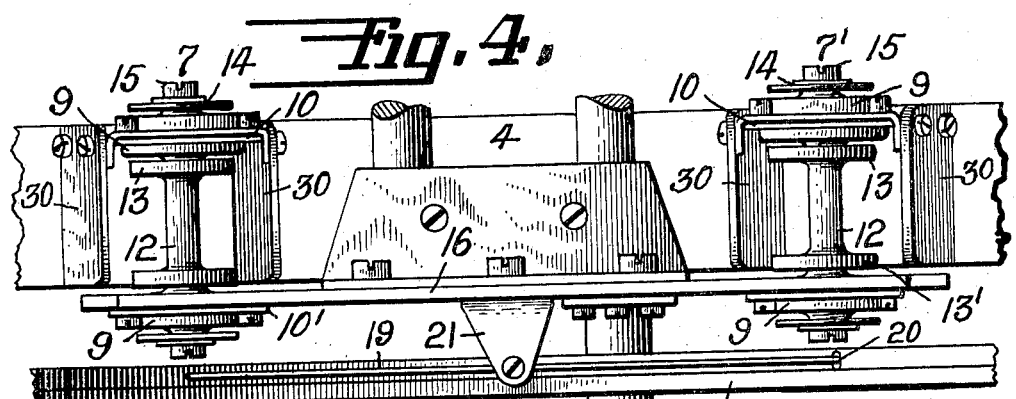
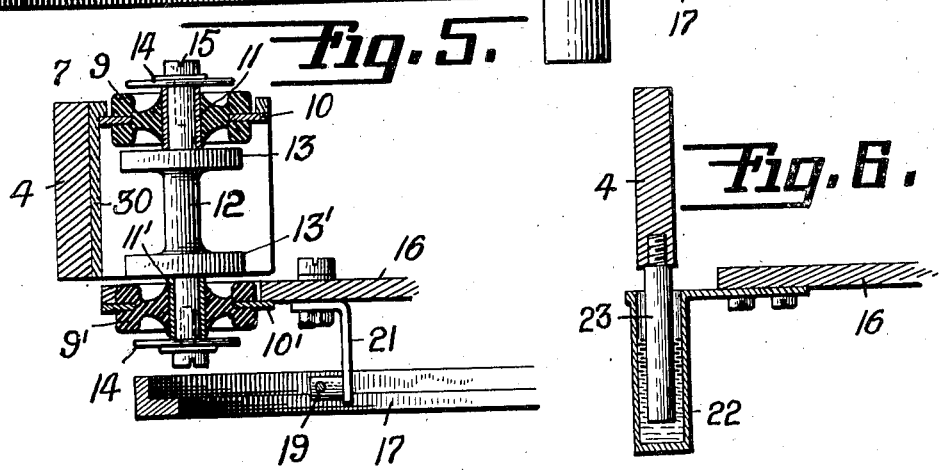
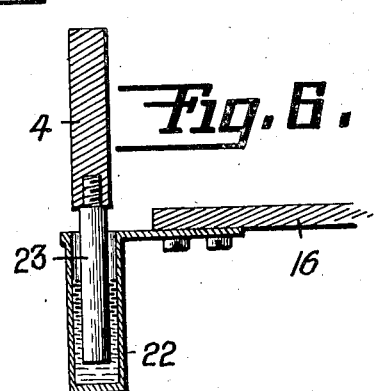
INVENTOR
FREDERICK D. BRADDON
BY
Herbert H. Thompson
HIS ATTORNEY.

Patented Sept. 3, 1940

2,213,832

UNITED STATES PATENT OFFICE 2,213,832

ANTIVIBRATION MOUNT FOR DIRECTION INDICATING INSTRUMENTS

Frederick D. Braddon, Babylon, N. Y., assignor to Sperry Gyroscope Company, Inc., Brooklyn, N. Y., a corporation of New York Application April 7, 1937, Serial No. 135,418

4 Claims. (Cl. 248—358)

This invention relates to resilient supports for gyroscopic compasses and other directional devices adapted to be mounted on moving vehicles, such as ships or airplanes.

The present practice in the gyroscopic compass art is to interpose between the compass support and the outer gimbal ring a plurality of shock absorbing springs or the like. It has also been proposed to lock the outer gimbal to the frame against relative rotation or twist of the compass.

According to my invention, I place a universal shock mounting inside of an inner gimbal ring and also place in this position a means for preventing relative rotation of the compass during yawing and pitching. This arrangement possesses the advantage over the prior art (a) that the gravitational loading on the mounting is always axially applied under all conditions of ship's trim, and (b) that the acceleration loading is also axially applied under all conditions of the ship's acceleration. This is because the compass is a freely suspended pendulum, in effect, and the inner spider therefore always assumes a true dynamic vertical, so that the entire supported load is in the direction of this virtual vertical,—in other words, in the direction of the shock the mounting is designed to support instead of being at an angle thereto, as is the case with the present systems.

In my invention I also have improved the resilient means for restraining the azimuthal motion of the lubber line of the compass, placing the same inside of the inner gimbal ring and avoiding the transmission of any vibration in any direction therethrough.

Referring to the drawings,

Fig. 4 is a detailed elevation of the shock absorbing and anti-twist mounting of the compass.

Fig. 5 is a vertical section through one of the rubber shock absorbers.

Fig 6 is a sectional view showing the dashpot connection between the gimbal ring and compass support.

Figure 1:
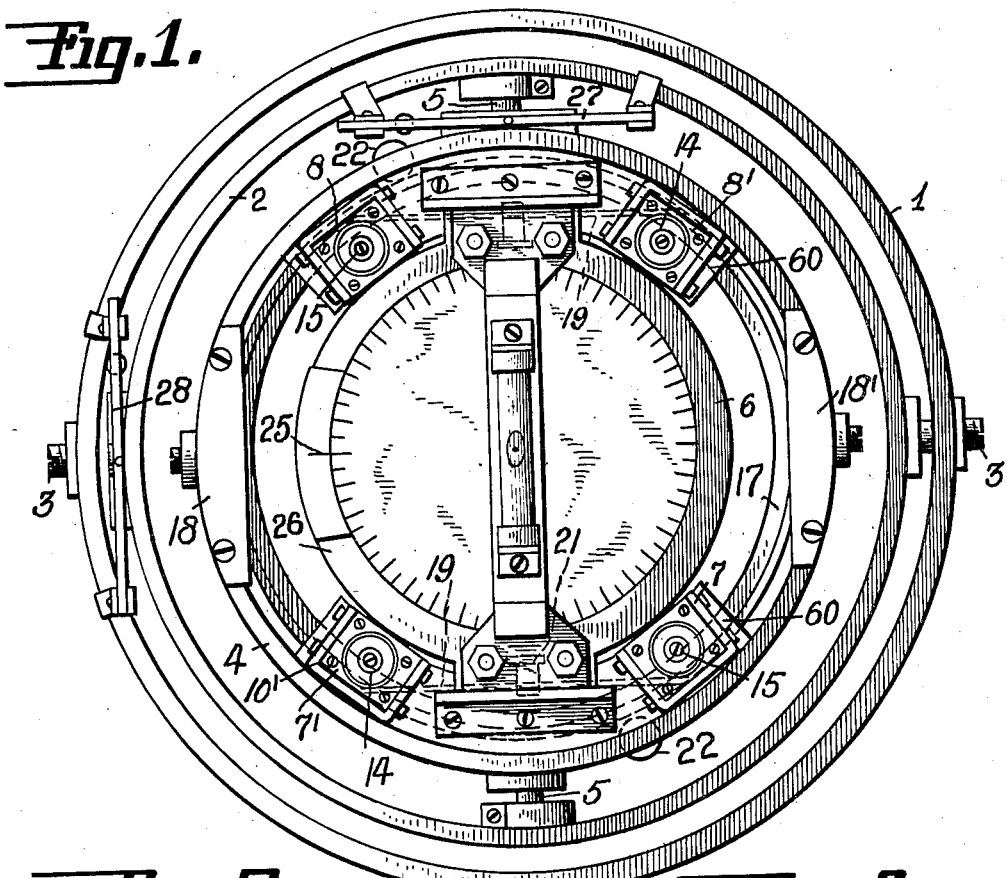
Fig. 1 is a plan view of a gyroscopic compass with my invention applied thereto.
Figure 2:
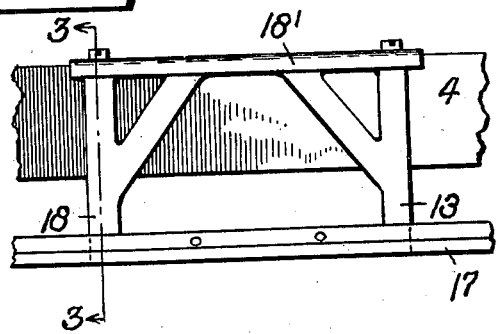
Fig. 2 is a detail, in elevation, showing the flat spring support for the auxiliary anti-twist ring.

In Fig. 1 of the drawings the outer support or binnacle of the compass is shown at 1, within which is pivotally mounted gimbal ring 2 on axis 3—3. Within said gimbal ring, in turn, is mounted a second ring 4 on transverse axis 5—5, the inner ring thereby constituting a universally gimballed support. The prior art practice has been to mount the shock absorbers between the binnacle 1 and the gimbal 2. According to my invention, however, I support the compass proper, 6, within the inner ring 4 by means of universal shock absorbing suspension means 7, 7' and 8, 8'. As shown, each shock absorber comprises a rubber disc-like member 9 which is supported around its periphery by means of a metal plate 10 secrued to the U-shaped bracket 30 which, in turn, is secured within gimbal ring 4. At the center of said disc is a metal ferrule 11, through which extends and is clamped a shaft 12 having annular collars 13 and 13' thereon which are clamped against the upper and lower ferrules 11 and 11' by means of washers 14 held in place by set screws 15. The rubber disc 9' at the bottom may be in all respects similar to the disc 9, having the metal ring 10' secured, in this instance, to the plate 16 supporting the compass spider. The spider is hence cushioned against shocks and jars in all planes, and since the shock absorbers are within the inner gimbal ring, the gravitational and acceleration forces will always be axial with respect to the shock absorbers, thus avoiding the lateral stress to which the prior mounting was subjected on list of the ship.

Figure 3:
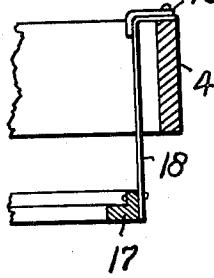
Fig. 3 is a section thereof, taken approximately on line 3—3 in Fig. 2.

In order to prevent twist of the lubber line, i. e., angular displacement of the compass due to this flexible mounting on rolling and pitching, I have shown an auxiliary anti-twist ring 17 secured below gimbal 4 by means of a pair of opposite spring metal brackets 18 and 18'. These brackets are shown as secured to the top of the gimbal ring 4 (see Fig. 3), the vertical legs being of thin resilient metal so that they may spring to the right or left in Figs. 1 and 3, but will not permit relative rotation of ring 17 with respect to the ship, i. e., with respect to ring 4. Ring 17, in turn, is anchored rotationally to each platform 16 by means of a wire 19 which is preferably secured at one end only to ring 17, the other end engaging a vertical slot 20 in said ring. Each wire is secured intermediate its ends to a bracket 21 extending downwardly from platform 16. Said wires therefore form a connection between ring 17 and platform 16, which will yield in any direction in a vertical plane at right angles to the yield of spring arms 18. Hence, no translatory vibration of the ship is transmitted in any plane to the compass through the anti-twist connections. Vibratory motions and forces are resolved into components in the aforementioned vertical plane and in a direction normal thereto, and are there filtered out by the described resilient mountings. At the same time all twisting in azimuth of the lubber line 25 and lubber ring 26, which of course is fixed to the spider on platform 16, is prevented by the wire anchorage, one wire being preferably placed under tension as the other is placed under compression. These couplings between ring 17 and supporting plates 16, plus the spring bracket arms 18 between the ring 17 and main supporting ring 4, prevent any twist of the compass support without transmitting translatory vibrations in any plane.

Resonant oscillations of the compass in any plane and both translatory (rectilinear) and rotary may be damped out by a pair of dashpots 22 secured to platform 16 and filled with a viscous oil, into which dip plungers 23 secured to ring 4. Such dampers are very effective in suppressing oscillations of the compass and its gimbal, both translatory and rotational, acting both as energy absorbers and to throw the oscillations of the compass and its support 16 out of phase with the causative ship's vibrations and also with the oscillations of the ring 4 and its supported parts. The function of these dampers is really two-fold. Firstly, the said dampers effectively destroy the lateral resonant oscillations of the compass with respect to ring 4 in all three planes, including rectilinear as well as rotational oscillations. Secondly, the dampers act to stabilize the gimbal ring 2 and its supported parts by introducing a phase difference between the lateral shift of the compass element within ring 4 and the pendulous moment acting on this unit, in much the fashion of coupled pendulums with a damping connection between the same. However, friction dampers or brakes 27 and 28 may also be employed for this purpose, if the other dampers are not sufficiently effective, but the latter have the advantage that they do not tend to set up oscillations in the compass during rolling and pitching of the ship.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. An antivibration mount for direction indicating instruments on moving craft, including a universal gimbal system having an inner and an outer member, a direction indicating instrument pendulously mounted therein, universally flexing shock absorbing means for vertically supporting said instrument in said inner member, whereby lateral stressing of said means due to lateral acceleration forces caused by motions of the craft is largely prevented, and a plurality of selective means also connecting said instrument and inner member substantially rigidly against relative rotation in azimuth, but flexing with translatory forces in all directions for preventing angular displacement of said instrument in azimuth.

2. An antivibration mount for direction indicating instruments on moving craft, including a universal gimbal system having an inner and an outer member, a direction indicating instrument pendulously mounted therein, universally flexing cushioning means for vertically supporting said instrument from said inner member, whereby decrease of the lateral effectiveness of said cushioning means due to gravitational and accelerational forces caused by the movements of said craft is prevented, a second ring intermediate said inner gimbal ring and said instrument, freely flexing means yieldable in only one direction, connecting said intermediate means with said gimbal ring, and other freely flexing means yieldable in a plane normal to said direction, anchoring said intermediate means to said instrument against relative rotation, whereby said instrument is locked against angular displacement in azimuth.

3. A support for gyroscopic compasses and the like, including resilient means suspending the compass in all planes, and means for preventing angular displacement of the compass in azimuth while permitting freedom of translatory movement in any direction, comprising an auxiliary ring, spring brackets connecting said ring and its support preventing angular displacement but permitting translatory movement in one horizontal direction, and a wire anchored against axial movement to said ring at each end and connected to the compass intermediate its ends and permitting translatory movement up and down and horizontally at right angles to the movement permitted by said bracket, but preventing angular displacement.

4. A vibration insulating mount for instruments, comprising a universal gimbal support, a resilient mounting for an instrument carried within said support whereby gravitational and accelerational forces exerted upon the instrument within said support extend in fixed directional relationship with respect to said mounting, comprising universally yieldable suspension means connecting said instrument to said gimbal support, a ring member, opposite spring brackets connecting said ring member to said gimbal support and yieldable in a vertical plane perpendicular thereto, and a pair of wires or rods extending perpendicularly to the plane of said brackets and yieldable in a plane parallel to said brackets but anchoring said ring and instrument against relative twisting in azimuth.

FREDERICK D. BRADDON.